Patented July 1, 1930

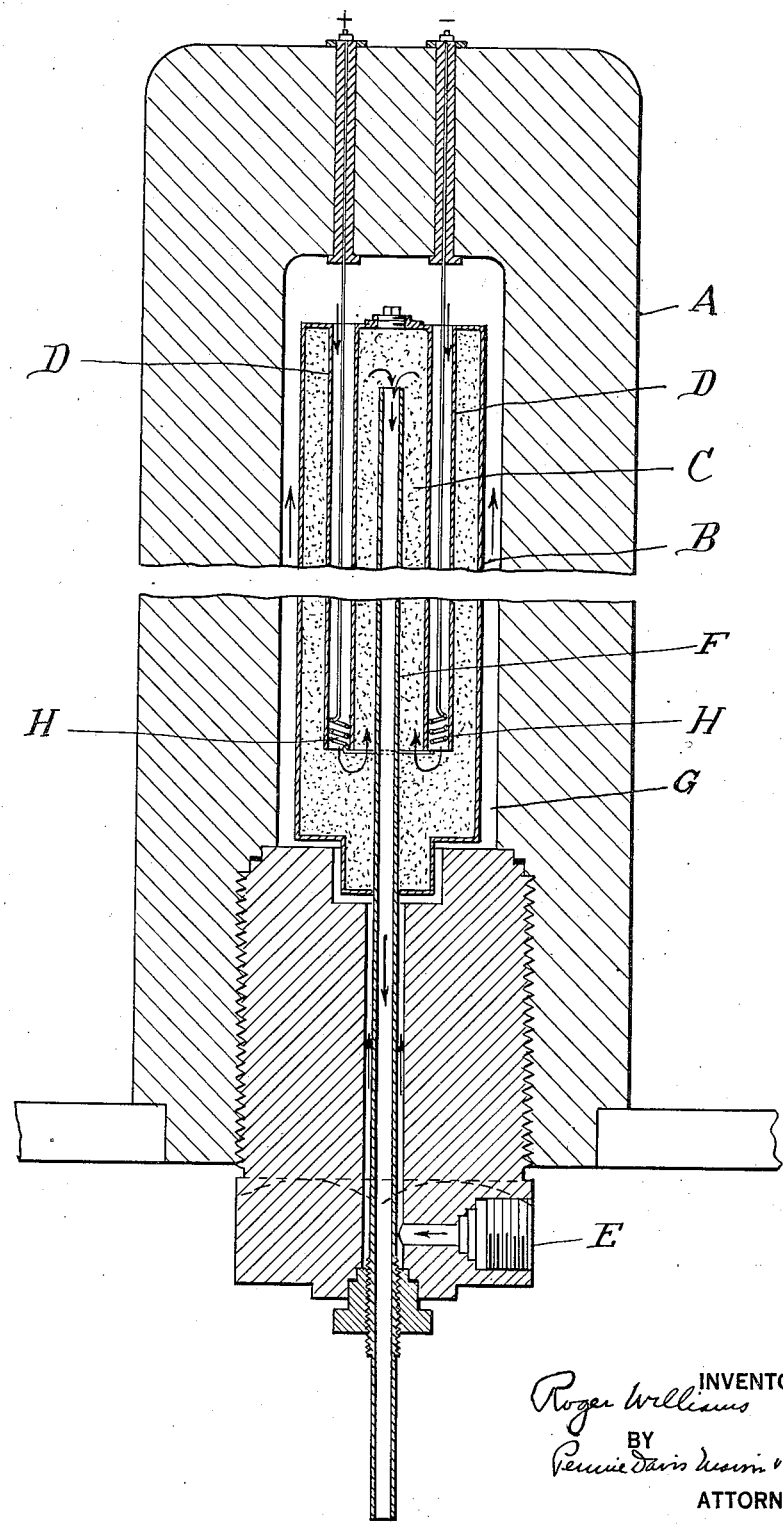

1,769,873

UNITED STATES PATENT OFFICE

ROGER WILLIAMS, OF WILMINGTON, DELAWARE, ASSIGNOR TO DU PONT AMMONIA CORPORATION, OF WILMINGTON, DELAWARE, A CORPORATION OF DELAWARE

METHOD OF AND APPARATUS FOR CONDUCTING CATALYTIC EXOTHERMIC GASEOUS REACTIONS

Application filed November 6, 1925. Serial No. 67,332.

This invention relates to improved methods of and apparatus for effecting exothermic gaseous reactions, and particularly for controlling such reactions to improve the efficiency thereof.

It is recognized that in carrying out catalytic exothermic gaseous reactions, particularly those of the type which, like the synthesis of ammonia and other syntheses employing hydrogen, are carried out under pressure, means must be provided for removing heat from the catalyst; otherwise the temperature of the catalyst will rapidly rise to value at which the physical form or activity of the catalyst may be unfavorably affected; the reaction equilibrium may be changed in such a way as to result in a lower conversion of the reacting gases; and/or undesirable side reactions may be accelerated.

The problem of removal of heat from the catalyst is complicated by the fact that the evolution of heat is by no means uniform throughout the body of catalyst. I have observed, for example, that in an apparatus for the synthesis of ammonia, in which the gases first contacted with the catalyst at a temperature of about 600° C., the temperature, during passage through the first 7 per cent of the catalyst tube, rose rapidly to a maximum of about 700° C. This temperature was substantially maintained through the next 15 per cent of the tube, but then fell off at a fairly constant rate until, on leaving the catalyst, the temperature of the gases was only about 400° C. From the standpoint of temperature distribution the catalyst may, therefore, be considered as consisting of three zones: (1) a small zone in which the temperature rises; (2) a somewhat larger zone in which a major portion of the reaction occurs with the temperature rapidly increasing to a maximum; (3) a comparatively large zone in which the temperature falls and the conversion may be relatively small.

Assuming that the gases as they first contact with the catalyst are not hot enough for the reaction to actively begin, as they flow in contact with the catalyst, the gases will at first react relatively slowly until the heat evolved has raised their temperature to a value at which the reaction will actively begin. This point in the catalyst marks the end of the first zone. Now, if it is remembered that a rise in temperature increases the velocity but is unfavorable to the equilibrium of an exothermic reaction, it will be seen that in the next portions of the catalyst with which the gases contact the reaction will take place with evolution of heat and more and more rapidly until a balance is established between the temperature attained and the equilibrium conversion corresponding to that temperature, which may be high enough to result in one or more of the unfavorable conditions previously referred to. The second zone of the catalyst will, therefore, constitute a region of high temperature. Since the concentration of product in this zone has practically reached the limit set by the high temperature, conversion brought about by the balance of the catalyst will be limited by the extent to which the gases are allowed to cool in contact with it and are thus brought into regions where the equilibrium conditions are more favorable. However, the tendency may be for the gases to cool too much, i. e., below the temperature at which the catalyst is effectively active; so that it may be that comparatively little conversion is effected in at least the latter part of the third zone of catalyst. Thus, in the case of the example of ammonia synthesis operation described above, the temperature was below 500° C. in the last 15 per cent of the catalyst tube, and this temperature ordinarily is too low for efficient carrying out of the reaction.

Those portions of the catalyst that are subjected to the highest temperatures may be expected to be the first to suffer deterioration. As the activity of the first portion of the catalyst decreases, the next portion will gradually become the zone of high conversion and high temperature. When this in turn becomes inactive, the zone of high temperature will be transferred to a succeeding portion, and so on. It will be seen that thus the catalyst may all eventually be rendered inactive and, as the process of deterioration goes on, progressively smaller amounts of active catalyst will be available to the gases contacting therewith.

It has been proposed heretofore to remove a portion of the surplus heat in the gases leaving the reaction zone. Some of the heat is carried off by merely discharging the gases after the reaction is completed. These gases have, however, as above indicated, a much lower temperature than the catalyst at the point where the reaction is most active and are available, therefore, as a cooling medium for the catalyst.

It is the object of the present invention to provide a method of and apparatus for utilizing the gaseous products of the reaction to cool the catalyst in the most effective manner and to remove the maximum of surplus heat therefrom.

Other objects and advantages of the invention will be apparent as it is better understood by reference to the following specification and accompanying drawing in which a suitable apparatus for effecting the improvement indicated is illustrated diagrammatically.

I have discovered that the removal of heat from the catalyst by means of the products of the reaction is facilitated when these products are passed within and in heat exchange relation with the catalyst but not in direct contact therewith and preferably in a direction opposite to the direction of travel of the reacting gases. The gaseous products leaving the cooler end of the catalyst are thus permitted to absorb heat, particularly from that zone of the catalyst where the reaction is most active. If the zone where the gases first directly contact with the catalyst is at too low a temperature some heat may be given up by the gaseous products in this region before the gaseous products escape, thus tending to equalize the temperature of the several zones by heat distribution within the catalyst. This may be understood more readily by reference to the zones as above mentioned. Since the gaseous products pass through the catalyst counter-current to the gases undergoing reaction, the returning products will not, because of the relatively slight temperature difference, absorb any material amount of heat from the third zone, but upon entering the second zone, where the evolution of heat is relatively great, absorption will be accelerated and the temperature of the gaseous products will rise accordingly. Upon passing into the first zone, if the reaction is not active there, a portion of the absorbed heat may be returned to the catalyst until it is raised to a temperature at which the reaction will proceed actively. Thereafter this zone would correspond to the second zone and heat would be actively absorbed and carried off in the gaseous products. The heat can be utilized, in any case, to raise the temperature of the cold gaseous mixture which is introduced to the apparatus, at the point where it may be delivered to the catalyst either with or without intermediate and further heating by heat exchange through indirect contact with the catalyst. The final temperature of the entering gases can be regulated by the application of heat from an external source as, for example, by the provision of a suitably arranged electric heating coil.

As an example of the type of apparatus which can be employed in carrying out the invention, the catalyst can be enclosed within a suitable receptacle which is in turn disposed within a chamber surrounded by a pressure-sustaining wall. The entering gaseous mixture can be introduced through a suitable inlet, preferably after heat exchange with the outgoing gaseous products. Conveniently, the entering gaseous mixture can be passed in heat exchanging relation either about or through the catalyst before it is delivered thereto. For example, the gaseous mixture may travel in the space between the catalyst receptacle and the pressure-sustaining wall and thence through tubes embedded in the catalyst or this arrangement may be reversed. When the gaseous mixture, preheated to the required temperature by heat exchange with the catalyst as described, is delivered thereto the reaction commences and the gaseous products are delivered from the catalyst at the opposite or cooler end thereof. At this point the gaseous mixture can be returned through one or more tubes embedded in the catalyst in heat exchange relation but not in direct contact therewith. The gaseous products thus pass through the successive zones of the catalyst and are discharged after absorbing surplus heat therefrom.

A suitable apparatus is illustrated in the accompanying drawing, in which A indicates a pressure-sustaining wall enclosing a chamber in which a catalyst receptacle B is disposed. A body of catalyst C is placed within the receptacle B and a plurality of tubes D are embedded therein and extend from one end, where they open into the space between the receptacle and the pressure-sustaining wall, to near the other end of the receptacle. The gaseous mixture enters through an inlet E and, after passing about an outlet tube F, enters the space G where it is in heat exchange relation with the catalyst. The gaseous mixture passes thence through the tubes D still in heat exchanging relation with the catalyst and is finally delivered to the catalyst. The gaseous products enter the tube F and return in heat exchanging relation with the catalyst, thereby absorbing heat in the zone of greatest reaction activity and escape finally in heat exchanging relation with the gaseous mixture entering at E. The gaseous products are thus used most efficiently to distribute and remove surplus heat which is released in the zone of greatest activity.

For the sake of convenience in temperature control the reaction may be carried out in such a way that the tendency is for the incoming gaseous mixture to reach the catalyst at a temperature slightly less than the lowest permitting the active commencement of the reaction. The balance of the heat required may be imparted to the gases from an external source, for example, by means of an electrical heating coil H. It may be necessary to use such a coil either continuously or intermittently, depending upon the heat evolved in the reaction, the radiation losses, the efficiency of heat exchange, etc.

While the apparatus as described is well adapted for the accomplishment of the purpose of the invention, it should be understood that various modifications thereof are possible to permit the distribution and removal of heat in and from the catalyst and that various changes can be made in the apparatus and in the operation thereof as hereinbefore described without departing from the invention or sacrificing any of the advantages thereof.

I claim:—

1. The method of effecting catalytic exothermic gaseous reactions, which comprises introducing a gaseous mixture to the catalyst and passing the gaseous poducts of the reaction through but not in direct contact with the catalyst.

2. The method of effecting catalytic exothermic gaseous reactions under pressure, which comprises passing a gaseous mixture over the catalyst and thereafter passing the gaseous products of the reaction in the opposite direction through but not in direct contact with the catalyst.

3. The method of effecting catalytic exothermic gaseous reactions, which comprises introducing a gaseous mixture to the catalyst, passing the gaseous products of the reaction through but not in direct contact with the catalyst and thereafter passing the gaseous products in heat exchange relation with the entering gaseous mixture.

4. The method of effecting catalytic exothermic gaseous reactions under pressure, which comprises passing a gaseous mixture over the catalyst, thereafter passing the gaseous products of the reaction in the opposite direction through but not in direct contact with the catalyst and then passing the gaseous products in heat exchange relation with the entering gaseous mixture.

5. The method of effecting catalytic exothermic gaseous reactions, which comprises conveying a gaseous mixture in heat exchange relation with the catalyst and thence into contact therewith and passing the gaseous products of the reaction through but not in direct contact with the catalyst.

6. The method of effecting catalytic exothermic gaseous reactions under pressure, which comprises conveying a gaseous mixture in heat exchange relation with the catalyst and thence into contact therewith and thereafter passing the products of the reaction in the opposite direction through but not in direct contact with the catalyst.

7. The method of effecting catalytic exothermic gaseous reactions, which comprises conveying a gaseous mixture in heat exchange relation with the catalyst and thence into contact therewith, passing the gaseous products of the reaction through but not in direct contact with the catalyst and thereafter passing the gaseous products in heat exchange relation with the entering gaseous mixture.

8. The method of effecting catalytic exothermic gaseous reactions under pressure, which comprises conveying a gaseous mixture in heat exchange relation with the catalyst and thence into contact therewith, thereafter passing the products of the reaction in the opposite direction through but not in direct contact with the catalyst and then passing the gaseous products in heat exchange relation with the entering gaseous mixture.

9. The method of effecting the catalytic synthesis of ammonia under pressure, which comprises passing a gaseous mixture over the catalyst and thereafter passing the gaseous products of the reaction in the opposite direction through but not in direct contact with the catalyst.

10. The method of effecting the catalytic synthesis of ammonia under pressure, which comprises introducing a gaseous mixture to the catalyst, passing the gaseous products of the reaction through but not in direct contact with the catalyst and thereafter passing the gaseous products in heat exchange relation with the entering gaseous mixture.

11. The method of effecting the catalytic synthesis of ammonia under pressure, which comprises passing a gaseous mixture over the catalyst, thereafter passing the gaseous products of the reaction in the opposite direction through but not in direct contact with the catalyst and then passing the gaseous products in heat exchange relation with the entering gaseous mixture.

12. The method of effecting the catalytic synthesis of ammonia under pressure, which comprises conveying a gaseous mixture in heat exchange relation with the catalyst and thence into contact therewith and passing the gaseous products of the reaction through but not in direct contact with the catalyst.

13. The method of effecting the catalytic synthesis of ammonia under pressure, which comprises conveying a gaseous mixture in heat exchange relation with the catalyst and thence into contact therewith and thereafter passing the products of the reaction in the opposite direction through but not in direct contact with the catalyst.

14. The method of effecting the catalytic synthesis of ammonia under pressure, which comprises conveying a gaseous mixture in heat exchange relation with the catalyst and thence into contact therewith, passing the gaseous products of the reaction through but not in direct contact with the catalyst and thereafter passing the gaseous products in heat exchange relation with the entering gaseous mixture.

15. The method of effecting the catalytic synthesis of ammonia under pressure, which comprises conveying a gaseous mixture in heat exchange relation with the catalyst and thence into contact therewith, thereafter passing the products of the reaction in the opposite direction through but not in direct contact with the catalyst and then passing the gaseous products in heat exchange relation with the entering gaseous mixture.

16. In an apparatus for effecting catalytic exothermic gaseous reactions under pressure, the combination of a pressure-sustaining wall, a catalyst receptacle therein and spaced from the wall to provide a passage for the entering gaseous mixture, means to supply a gaseous mixture to the space and to deliver it to the catalyst and means connected to an outlet for the gases and embedded in the catalyst to direct the gaseous products of the reaction through but not in direct contact with the catalyst.

17. In an apparatus for effecting catalytic exothermic gaseous reactions under pressure, the combination of a pressure-sustaining wall, a catalyst receptacle therein and spaced from the wall to provide a passage for the entering gaseous mixture, means to supply a gaseous mixture to the space and to deliver it to the catalyst and a tube embedded in the catalyst and connected to an outlet for the gases to direct the gaseous products of the reaction through but not in direct contact with the catalyst.

18. In an apparatus for effecting catalytic exothermic gaseous reactions under pressure, the combination of a pressure-sustaining wall, a catalyst receptacle therein and spaced from the wall to provide a passage for the entering gaseous mixture, means to supply a gaseous mixture to the space and to deliver it to the catalyst, means to direct the gaseous products of the reaction through but not in direct contact with the catalyst and means connected to an outlet for the gases and embedded in the catalyst to permit heat exchange between the products of the reaction and the entering gaseous mixture.

19. In an apparatus for effecting catalytic exothermic gaseous reactions under pressure, the combination of a pressure-sustaining wall, a catalyst receptacle therein and spaced from the wall to provide a passage for the entering gaseous mixture, means to supply a gaseous mixture to the space and to deliver it to the catalyst, a tube embedded in the catalyst and connected to an outlet for the gases to direct the gaseous products of the reaction through but not in direct contact with the catalyst and means to permit heat exchange between the products of the reaction and the entering gaseous mixture.

20. In an apparatus for effecting catalytic exothermic gaseous reactions under pressure, the combination of a pressure-sustaining wall, a catalyst receptacle therein, means for passing the gases to react through but not in direct contact with the catalyst prior to actual contact therewith and means for passing the gaseous products of the reaction through but not in direct contact with the catalyst.

21. In an apparatus for effecting catalytic exothermic gaseous reactions under pressure, the combination of a pressure-sustaining wall, a catalyst receptacle therein, a conduit embedded within the catalyst and provided with an opening adapted to lead the gases into direct contact with the catalyst, and a second conduit embedded within the catalyst with an opening adapted to lead the gaseous products of the reaction through but not in direct contact with the catalyst, said openings being disposed at opposite ends of said catalyst receptacle.

22. In an apparatus for effecting catalytic exothermic gaseous reactions, a catalyst receptacle with an entrance conduit for the gases extending through a major portion of the catalyst and an exit conduit extending in the opposite direction through a major portion of the catalyst.

23. In an apparatus for effecting catalytic exothermic gaseous reactions, the combination of a catalyst receptacle, a catalyst therein and conduits embedded in the catalyst and connected respectively to the inlet and outlet for gases entering and leaving the catalyst receptacle, the conduits communicating with the interior of the catalyst receptacle at opposite ends thereof.

In testimony whereof I affix my signature.

ROGER WILLIAMS.